United States Patent
Fenger

(10) Patent No.: US 12,545,555 B2
(45) Date of Patent: Feb. 10, 2026

(54) EXTENSION YOKE FOR SELF-HOISTING CRANE, A SELF-HOISTING WIND TURBINE CRANE WITH AN EXTENSION YOKE, AND USE OF AN EXTENSION YOKE

(71) Applicant: LIFTRA IP ApS, Aalborg (DK)

(72) Inventor: Per Eske Fenger, Terndrup (DK)

(73) Assignee: LIFTRA IP APS, Aalborg (DK)

( * ) Notice: Subject to any disclaimer, the term of this patent is extended or adjusted under 35 U.S.C. 154(b) by 186 days.

(21) Appl. No.: 18/014,682

(22) PCT Filed: Jul. 7, 2021

(86) PCT No.: PCT/DK2021/050228
§ 371 (c)(1),
(2) Date: Jan. 5, 2023

(87) PCT Pub. No.: WO2022/008019
PCT Pub. Date: Jan. 13, 2022

(65) Prior Publication Data
US 2023/0249947 A1   Aug. 10, 2023

(30) Foreign Application Priority Data

Jul. 8, 2020   (DK) .................................. 2020 00823

(51) Int. Cl.
*B66C 1/10*   (2006.01)
*B66C 23/20*   (2006.01)
*F03D 13/10*   (2016.01)

(52) U.S. Cl.
CPC ............ *B66C 1/108* (2013.01); *B66C 23/207* (2013.01); *F03D 13/10* (2016.05)

(58) Field of Classification Search
CPC ....... F03D 13/10; B66C 1/108; B66C 23/207; B66C 23/66; B66C 23/702
See application file for complete search history.

(56) References Cited

U.S. PATENT DOCUMENTS 2,703,180  A    3/1955  Brown
3,349,925  A   10/1967  Waerum et al.
(Continued)

FOREIGN PATENT DOCUMENTS

CN   205616470 U   10/2016
CN   108473285 A    8/2018
(Continued)

OTHER PUBLICATIONS

Fenger Per Eske et al., Upscaling—the game changers Smart Installation and Service tool solutions, Liftra Provides Tailor Made Solutions for Special Lifting and Transportation Tasks in the Global Wind Turbine Industry, Oct. 7, 2019 (18 pages).

*Primary Examiner* — Moshe Wilensky
(74) *Attorney, Agent, or Firm* — Holland & Hart LLP

(57) ABSTRACT

An extension yoke, a self-hoisting wind turbine crane with such a yoke, and a method of using such a yoke are disclosed. The yoke comprises a frame structure comprising a lifting portion and a load transfer portion, forming an obtuse angle with each other, and at least one crane attachment element positioned between the load transfer portion and the lifting portion, said at least one crane attachment element being configured for establishing a pivot connection to a crane. The lifting portion comprised a load attachment element and the load transfer portion comprise at least one load transfer element, said load transfer element being configured for transferring compressive force by pressing against a reception surface of the crane and for moving in relation to the reception surface. The frame structure may comprise at least two substantially parallel longitudinal beams, at least one cross-beam, and/or at least one stabilisation element.

19 Claims, 5 Drawing Sheets

(56) References Cited

U.S. PATENT DOCUMENTS

| | | | |
|---|---|---|---|
| 3,675,961 | A | 7/1972 | Wheeler |
| 4,251,098 | A | 2/1981 | Belinsky |
| 2009/0260265 | A1 | 10/2009 | Aeschbacher et al. |
| 2018/0111805 | A1 | 4/2018 | Lopez Pielago et al. |
| 2018/0346293 | A1 | 12/2018 | Carmel |

FOREIGN PATENT DOCUMENTS

| | | | | |
|---|---|---|---|---|
| CN | 109843777 | A | 6/2019 | |
| CN | 110182698 | A | 8/2019 | |
| DE | 4134039 | A1 | 4/1993 | |
| DE | 102006004207 | A1 | 8/2007 | |
| EP | 1677007 | A2 * | 7/2006 | ........... B66C 23/207 |
| WO | WO2018041313 | A1 | 3/2018 | |
| WO | WO2020035119 | A1 | 2/2020 | |

\* cited by examiner

EXTENSION YOKE FOR SELF-HOISTING CRANE, A SELF-HOISTING WIND TURBINE CRANE WITH AN EXTENSION YOKE, AND USE OF AN EXTENSION YOKE

CROSS-REFERENCE

The present application is the national phase entry under 35 U.S.C. 371 of International Patent Application No. PCT/DK2021/050228 by Fenger, entitled "AN EXTENSION YOKE FOR SELF-HOISTING CRANE, A SELF-HOISTING WIND TURBINE CRANE WITH AN EXTENSION YOKE, AND USE OF AN EXTENSION YOKE", filed Jul. 7, 2021, and claims the benefit of Danish Patent Application No. PA 2020 00823 by Fenger, entitled "AN EXTENSION YOKE FOR SELF-HOISTING CRANE, A SELF-HOISTING WIND TURBINE CRANE WITH AN EXTENSION YOKE, AND USE OF AN EXTENSION YOKE", filed Jul. 8, 2020, each of which is assigned to the assignee hereof and is incorporated by reference in its entirety.

TECHNICAL FIELD

The present disclosure relates to an extension yoke for a self-hoisting wind turbine crane, a self-hoisting wind turbine crane with an extension yoke, and to use of an extension yoke for a self-hosting wind turbine crane.

BACKGROUND

When servicing or replacing components in larger wind turbines, small transportable self-hoisting boom cranes are often used for hoisting components, such as gearboxes, generators, transformers, main bearings, and rotors, up and down to the nacelle of the wind turbine. Such cranes typically comprise an anchoring bracket arranged in the nacelle of the wind turbine and a crane part comprising a crane boom connected via a wire to a pulley block comprising a crane hook.

Land wind turbine sites are most often remote and situated in rural areas with poor road infrastructure, and transportation of the crane to a wind turbine site is thus often tedious and costly. For sea wind turbines the crane is usually transported on sea to the site using tugs or small transport boats and weather conditions are often a challenge. To facilitate transportation and keep cost down, many such cranes are designed and dimensioned to fit in one or more standard intermodal containers, which can be handled using standardized equipment and will protect the crane during transportation. An example of a typical crane made to fit a forty feet container is the applicant's LT1200 Liftra self-hoisting crane, which has a reach of around 7 meters.

In use the crane may be used to reach all areas of the nacelle of a wind turbine to be able to lift and position different components and may therefore be used to reach further in a horizontal direction than what is possible with a crane boom that can be fitted into a forty feet container.

To achieve a longer crane reach it is commonly known to make use of a lifting beam. The lifting beam is an elongate beam with two ends and a crane attachment element for connecting with the crane hook at the centre of the beam. At the first end there is a load attachment element for attaching items to be lifted and at the second end there is a counterweight attachment element for attaching a counterweight. The counterweight is chosen so that it matches the weight of the item to be lifted so that the lifting beam can be kept substantially horizontal when hoisting. An example of such a lifting beam can be seen in U.S. Pat. No. 3,675,961A.

A problem associated with using a lifting beam to extend the reach of the crane is that the accumulated weight of the lifting beam and the counterweights reduces the effective working load limit (WLL) of the crane. As a result, the maximum weight of items that can be hoisted using the crane with the lifting beam will be approximately half of the maximum weight of items that can be hoisted using the crane without the lifting beam. With the lifting beam in use the crane may therefore be unable to hoist heavy components, such as a gearbox, up to and down from the nacelle.

Another problem of using a lifting beam for extending the reach of the crane boom is that the counterweight may need to be adjusted before each hoist. The process of adjusting the counterweight may delay the process of replacing components in the nacelle and result in long wind turbine downtime and higher cost for replacing components.

Yet another problem of using a lifting beam is that the elongate lifting beam and counterweight(s) may demand a whole separate container to be transported to the wind turbine site, thereby causing higher complexity in logistics when replacing components and increasing the cost of the process.

Another problem of using a lifting beam for hoisting is that it is sensitive to wind and may therefore not be usable during high wind speeds, which often occur at wind turbine sites. A rotation of the horizontal beam due to wind may be hazardous for wind turbine installation personnel, damage the wind turbine tower, and/or make it difficult to place components at or in the nacelle.

SUMMARY

It is therefore an object of the disclosure to provide an alternative solution for extending the reach of a self-hoisting wind turbine crane with a minimal influence on the lifting capacity of the crane.

In addition, it may be an object of the disclosure to provide a solution for extending the reach of a self-hoisting crane that may be used at high wind speeds with a high degree of safety.

It may be a further object of the disclosure to provide an extension yoke taking up minimal space during transportation.

In a first aspect of the disclosure at least one of these objects is realised with an extension yoke for a self-hoisting wind turbine crane, the extension yoke comprising a frame structure comprising:

a lifting portion,
a load transfer portion, and
at least one crane attachment element between the load transfer portion and the lifting portion, said at least one crane attachment element being configured for establishing a pivot connection to a crane,
where the lifting portion has a proximal end at the crane attachment element, a distal end opposite the proximal end, and a load attachment element at the distal end,
where the load transfer portion has a proximal end at the crane attachment element, a distal end opposite the proximal end, and at least one load transfer element at the distal end, said load transfer element being configured for transferring compressive force by pressing against a reception surface of the crane and for moving in relation to the reception surface,
where the load transfer portion and the lifting portion form an obtuse angle with each other, and where the frame structure further comprises at least one stabilisation element interconnecting portions of the frame structure, said stabilisation element(s) forming an acute angle with at least one portion.

By being configured for transferring compressive force by pressing against a reception surface of the crane, the load transfer element allows the crane itself to counter the load of the items being lifted, thus eliminating the need for counterweights. This means that it is only the weight of the extension yoke itself that reduces the effective lifting capacity or WLL of the crane, thereby providing extended reach with an effective lifting capacity close to the crane's total lifting capacity.

Further, by eliminating the counterweight, it is no longer necessary to provide several counterweights, and there is no need for adjustment before each hoist. In addition, the contact between the crane and the extension yoke means that the extension yoke is less likely to rotate under the influence of wind, at least during a part of the hoist, and thus less likely to cause damage to the crane, the wind turbine, and personnel.

The ability to move in relation to the reception surface in combination with the obtuse angle between the load transfer portion and the lifting portion allows the yoke to be active only during the part of the hoist where the extension of the reach is used, whereas the yoke hangs passively from the crane during the rest of the hoist. The movement of the load transfer element in relation to the reception surface results in a displacement of the load transfer element relative to the crane, for example by the load transfer element rolling or sliding over a surface of the crane as will be described in more detail below. In other words, the load transfer element is configured for being displaced in relation to the reception surface while being in contact therewith.

The stabilisation element may connect the lifting portion and the load transfer portion of the frame structure to create a triangular structure for stabilising the frame structure and/or for reducing stress in a connection between the lifting portion and the load transfer portion.

A stabilisation element may for example be a substantially noncompressible element, such as a beam or bar, which increases the stiffness and rigidity of the extension yoke, so that it can for example endure larger torsional forces. As another example at least one stabilisation element may be a tension element, such as a band, tape, strap, thread, or cable, which is a lightweight alternative for distributing force and strengthen the extension yoke, particularly when a load is attached.

In one example, the frame structure comprises at least two substantially parallel longitudinal beams. This means that load attached to the frame structure can be distributed on the at least two parallel longitudinal beams, which reduces stress in each of the beams and may allow for using lighter or more compact beams, potentially resulting in a longer lasting frame structure and/or a higher effective lifting capacity.

With a space between the two parallel longitudinal beams the frame structure potentially also becomes more stable during use as there can be two or more points of contact between the load transfer element(s) and the reception surface at a distance from each other. This also means that the load affecting each point of contact will be lower.

A space provided between two longitudinal beams can be used to fit objects in between them e.g. a pulley block, as will be described later.

In a further example, the frame structure comprises at least one cross-beam connecting the at least two substantially parallel longitudinal beams. The at least one cross-beam may further distribute the force on the at least two longitudinal beams and thus, create a more balanced structure, thereby providing greater stability.

At least one cross-beam may be positioned at an indent, bend or the like on at least one of the longitudinal beams for strengthening or supporting that part of the longitudinal beam.

In one example, the frame structure comprises at least one cross-beam, which forms part of the lifting portion, and at least one cross-beam, which forms part of the load transfer portion, which further enhances the stability and strength of the frame structure.

In one example, a first end of at least one stabilisation element is connected to the distal end of the lifting portion and a second end of the stabilisation element is connected to the load transfer portion.

In an example, at least one stabilisation element is shiftable such that the angle between the stabilisation element and the lifting portion can be altered or the angle between the stabilisation element and the load transfer portion can be altered for adapting the extension yoke to different types of loads and forces. This may also be advantageous in connection with a possible adjustment of the obtuse angle as will be described later.

The length of the stabilisation element can be adjustable for example by the stabilisation element comprising a telescopic joint, a releasable joint, and/or an extension piece. By shortening or extending the length of the stabilisation element the position of it in relation to the lifting portion and/or the load transfer portion can be changed so that forces in the frame structure is distributed differently.

In an example, the stabilisation element comprises a series of openings extending in a length direction of the stabilisation element, and the load transfer portion comprises a releasable joint for connecting to an opening of the stabilisation element. Here the utilised length of the stabilisation element is the length extending between the first end connected to the distal end of the lifting portion and the opening in the stabilisation element connected to the releasable joint of the load transfer portion. Thus, the utilised length of the stabilisation element can be adjusted by connecting the releasable joint to different holes of the stabilisation element, while the total length of the stabilisation element remains unchanged.

A releasable joint may be used at the connection between the stabilisation element and the lifting portion, the stabilisation element and the load transfer portion, or at both connections. The openings may be through holes, cavities, or the like adapted for engaging with ta pin, bolt or the like of the joint.

One or more stabilisation elements may connect longitudinal beams of the frame structure.

The load attachment element may for example comprise a shackle, ring, hook, or snap hook. The load attachment element being a shackle or snap hook allows a manually secured attachment of the load during lifts and placement in the nacelle, as the shackle or snap hook provides a closed loop and allows for easy attachment and detachment of loads through a manual release mechanism. The load element being a ring or hook allows for easy attachment of load by hanging, and by using gravity to keep the load in place.

The load attachment element may for example be of steel, aluminium, carbon composite, composite material or a combination of these.

In one example, the load attachment element is replaceable, such that different types or sizes of the load attachment elements can be selected to fit the load, size, or attachment requirements set by different types of load.

The at least one load attachment element may be provided on a beam of the frame structure. In one example it is provided on a cross-beam extending between two longitudinal beams of the frame structure, so that a load's centre of mass is pulling on the cross-beam, and so that the load is being distributed substantially evenly on the at least two longitudinal beams. In another example, the at least one load attachment element is provided on a longitudinal beam for having the load affecting the beam directly.

In an example, the extension yoke comprises at least two load attachment elements each being provided on or at one of at least two longitudinal beams providing the option to attach a load at two points or to attach two separate loads to the extension yoke.

The crane attachment element may be a simple hook, ring, shackle or the like provided on the frame structure as described with reference to the load attachment element above.

In one example, the frame structure comprises two crane attachment elements, each being provided on or at one of two substantially parallel longitudinal beams. This may provide stability and a uniform load distribution on the two longitudinal beams. Having two crane attachment elements may further increase the safety when hoisting and placing loads, as a second crane attachment element can function as a fail safety if the first crane attachment element fails or detaches and vice versa.

In one example, the two crane attachment elements are each provided on an inner side of a longitudinal beam of the frame structure, and thus facing a space between the longitudinal beams. This may for example allow a crane pulley block to be arranged between the longitudinal beams and connected to both of them.

In one example the two crane attachment elements are each pivotally connected to a beam of the frame structure providing an axis of rotation extending between them, around which the extension yoke to pivot when in use.

When using pivot connections between two crane attachment elements and a pulley block is arranged between them, the connections should be coaxial in a direction substantially perpendicular to the direction in which the at least two longitudinal beams extend to allow the extension yoke to rotate around the pulley block.

In an example, the pivot connection between the crane attachment element and the frame structure is at the vertex of the obtuse angle.

In an example, the crane attachment element comprises a pulley block reception element comprising two plates each being pivotally connected to a longitudinal beam and at least one connector member extending between the two plates. In an installed position the pulley block reception element fixates the pulley block and thus provides a connection between the crane and the frame structure. The extension yoke and the pulley block can then only rotate about the axis defined by the pivot connections between the plates and the beams, which contributes to stability in windy conditions.

In an example, the connector member pairs with a recess, hole or the like in the pulley block to fasten the pulley block to the pulley block reception element and hence to the crane attachment element.

In a similar example, the connector member comprises at least one fastener for fastening the connector member to the pulley block. The fastener(s) can for example be any chosen from the group consisting of: screw, nail, pin, bolt, threaded rod, and a combination hereof.

The pulley block reception element may comprise two or more connector members, preferably 3-6 connector members, and most preferably 4 connector members.

In one example the pulley block reception element comprises connector members chosen from the group consisting of: rods, crossbars, bars, elastic members, plates, strings, and springs.

As mentioned above, the load transfer element allows a transfer of compressive force from the frame structure to the reception surface of the crane boom, while moving along the reception surface of the crane boom, which may cause the frame structure to rotate around the crane attachment element or a rotation axis hereof.

In an example, the extension yoke can be rotated about the crane attachment element from a hoisting position, where the lifting portion is substantially vertical, to an extended position, where the lifting portion is substantially horizontal and where the load transfer element is in contact with the reception surface.

In an example, the extension yoke can be rotated up to 120 degrees, more particular up to 105 degrees, and even more particular up to 90 degrees, about the crane attachment element from the hoisting position to the extended position and vice versa.

The load transfer element may for example comprise at least one element chosen from the group consisting of: a wheel, a ball, a roller, a ball joint, a rounded end, a smoot end surface, a slide plate, a slide shoe, a slide block, a friction reducing coating, and a combination of these.

If the load transfer element is of a rolling type, such as a wheel, it allows for a low threshold of force before the element starts moving along the reception surface. A rolling type load transfer element can further be used for any crane having a reception surface.

If the load transfer element is of a sliding type, such as a slide shoe, adapted for sliding, it a slide path if creates a controlled movement in a predefined path for the load transfer element when moving from a hoisting position to an extended position and vice versa.

The load transfer element may comprise at least one guiding member for guiding the movement of the load transfer element on the reception surface of the crane boom. In an example, the guiding member engages with a second surface of the crane boom, so that the load transfer element is guided along this surface. The second surface may be perpendicular to the reception surface.

In one example, the guiding member is chosen from a group consisting of a: flange, a plate, roller, bracket, or wheel.

The frame structure may comprise beams made from a material chosen from the group consisting of: steel, hardened steel, heat-treated steel, compressed steel, refined steel, compressed steel, cast iron, aluminium, aluminium alloy, polymer, carbon composite, and a combination of these. The frame structure primarily consisting of a type of steel may ensure a high strength and durability due to the mechanical properties of the material. The frame structure consisting of a lighter material, such as carbon composite or aluminium, may allow for a lightweight solution with a high strength, while having a high effective lifting capacity compared to heavier materials.

In an example, the connection between the lifting portion and the load transfer portion of the frame structure is a releasable joint, where the two portions can be moved in relation to each other to change the obtuse angle of the frame structure, e.g. for changing the reach of the extension yoke, or for easing transportation.

In one example, the releasable joint is a joint chosen from the group consisting of: pin connection, pivot joint, bolted joint, screw joint, saddle joint, and plane joint.

A repositioning of the lifting portion in relation to the load transfer portion may be caused by a stabilisation element having a fixed connection to the lifting portion and a shiftable connection to the load transfer portion or vice versa. Thus, moving the end of the stabilisation element, which is shiftably connected, towards the vertex of the obtuse angle will cause the obtuse angle to widen. Alternatively, moving the shiftable end of the stabilisation element away from the vertex of the obtuse angle will cause the obtuse angle to narrow, thereby shortening the total length of the extension yoke. It is also possible to have shiftable connections at both ends of the stabilisation element.

If the length of the stabilisation element is adjustable, a change of the obtuse angle can be achieved by changing the length of the stabilisation element instead of shifting one end of a fixed length stabilisation element as described above. It is also within the scope of the disclosure to use one or more stabilisation elements, which has/have both an adjustable length and a shiftable connection to the lifting portion and/or load transfer portion.

In an example, the connection between the lifting portion and the load transfer portion of the frame structure is a permanent joint fixing the obtuse angle to a predefined angle. Thereby, providing a desired angle and a strong joint at the vertex of the obtuse angle.

In one example, the fixed joint is a joint chosen from the group consisting of: welding, weld joint, tenon joint, feather joint box joint, bolted connection, and bracket joint.

In one example, the obtuse angle is 95-180 degrees, more particular 100-160 and even more particular 110-140 degrees.

In a second aspect of the disclosure at least one object of the disclosure is achieved by a self-hoisting wind turbine crane with an extension yoke, as described above, where the crane comprises:
  a crane boom having a reception surface,
  a pulley block, and
  at least one wire connecting the pulley block to the crane boom,
  where the extension yoke is pivotally connected to the pulley block, and where the load transfer element and the reception surface of the crane are configured for coming into contact with each other during operation and transferring compressive force from the load transfer element to the reception surface.

By having a self-hoisting crane with an extension yoke as described above, the reach of the self-hoisting crane can be significantly longer than the crane boom itself, thus increasing the applicability of the crane. Further, the self-hoisting crane with the extension yoke can be used without additional equipment for lifting even large objects and can be used without adjustment between lifts.

In one example, the self-hoisting crane and the extension yoke are dimensioned to fit in one, one and a half, or two forty feet containers, so that the transportation of the self-hoisting crane and the extension yoke can be achieved with simple, standardized equipment.

A reception surface adapted for contact with the load transfer element(s) may also be provided on other parts of the crane.

The reception surface may for example be formed by the major surface of one or more plate members or by the edge of one or more plate members used for the formation of the crane boom, but additional elements such as rails may also be employed.

examples and advantages described with reference to the first aspect of the disclosure also applies to the second aspect of the disclosure and vice versa.

In a third aspect of the disclosure the objectives are achieved by the use of an extension yoke as described above for increasing the reach of a self-hoisting crane, by:
  connecting the crane attachment element of the extension yoke to a pulley block of the crane in a pivot connection,
  attaching a load to the load attachment element,
  using the crane to lift the pulley block, the extension yoke, and the attached load,
  where, during the lift, the load transfer element at the distal end of the load transfer portion comes into contact with a reception surface of a crane boom of the crane and transfers compressive force to the crane boom, and the load transfer element moves along the reception surface while the extension yoke pivots around the pulley block.

By having the extension yoke transfer compressive force to the crane boom and pivoting around the pulley block into an extended position, the reach of the crane is extended when in the extended position. Further, the transfer of compressive force to the crane eliminates the need for counterweight as the crane itself works as a counterweight.

examples and advantages described with reference to the first and second aspects of the disclosure also applies to the third aspect of the disclosure and vice versa.

Other objectives, features and advantages of the present inventive concept will appear from the following detailed disclosure, from the attached claims, as well as from the drawings.

BRIEF DESCRIPTION OF THE DRAWINGS

In the following the disclosure will be described in more detail with reference to the drawing, where.

DETAILED DESCRIPTION

Figure 1:
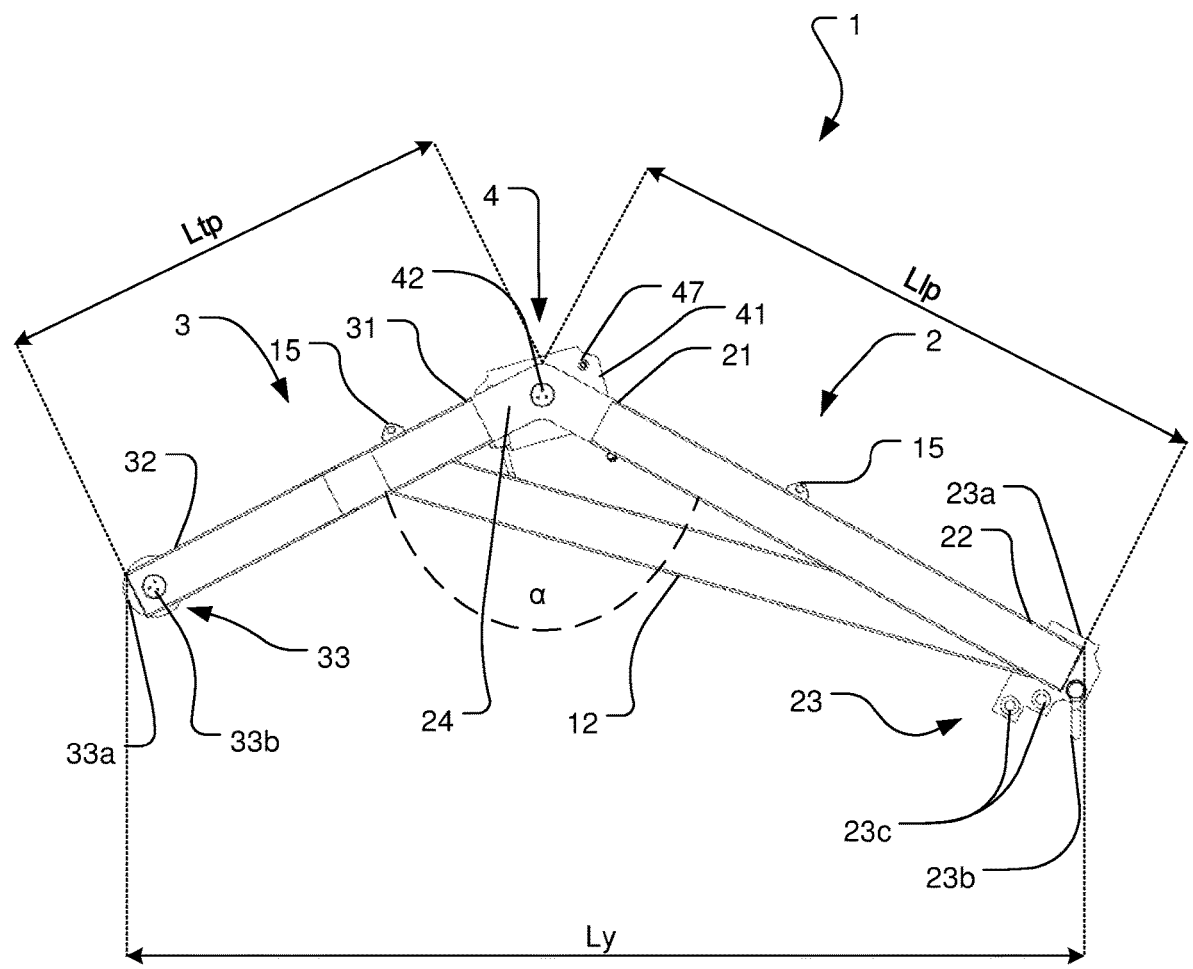
FIG. 1 is a side view of an extension yoke according to the disclosure.

FIG. 1 shows an extension yoke 1 for a self-hoisting wind turbine crane, comprising a frame structure, where the frame structure has a lifting portion 2 and a load transfer portion 3. The load transfer portion 2 and the lifting portion 3 form an obtuse angle α with each other, in this example of around 125 degrees.

The lifting portion 2 has a proximal end 21 at the vertex of the obtuse angle α, a distal end 22 opposite the proximal end, and a load attachment element 23 at the distal end 22 for attaching loads to the extension yoke.

Likewise, the load transfer portion 3 has a proximal end 31 at the vertex of the obtuse angle, and a distal end 32 opposite the proximal end 31. At the distal end 32 a load transfer element 33 in the form of a wheel 33a is provided. The load transfer element 33 is for transferring compressive force from the extension yoke 1 to a reception surface of a crane (not shown in FIG. 1) and for moving in relation to the reception surface as will be described in detail later.

In FIG. 1, the lifting portion 2 and the load transfer portion 3 are separate beams connected to each other by a fixed beam joint 24 at the vertex of the obtuse angle α, but a single bent beam extending from the distal end 32 of the load transfer portion 3 to the distal end 22 of the lifting portion 2 could also be employed. In a still further example, beams of the lifting portion 2 and the load transfer portion 3 are connected in a releasable joint so that the obtuse angle α can be changed and/or the frame structure taken apart for transportation and repairs.

In FIG. 1, a stabilisation element 12 in the form of a beam is connected to and extends from the distal end 22 of the lifting portion 2 to connect with the load transfer portion 3, forming an acute angle with both the lifting portion and load transfer portion. In this way the frame structure is given a triangular shape with increased stability. A similar structure may be achieved by making the stabilisation element 12 extend from the distal end 32 of the load transfer portion 3 to the lifting portion 2 or from one distal end to the other.

Figure 2:
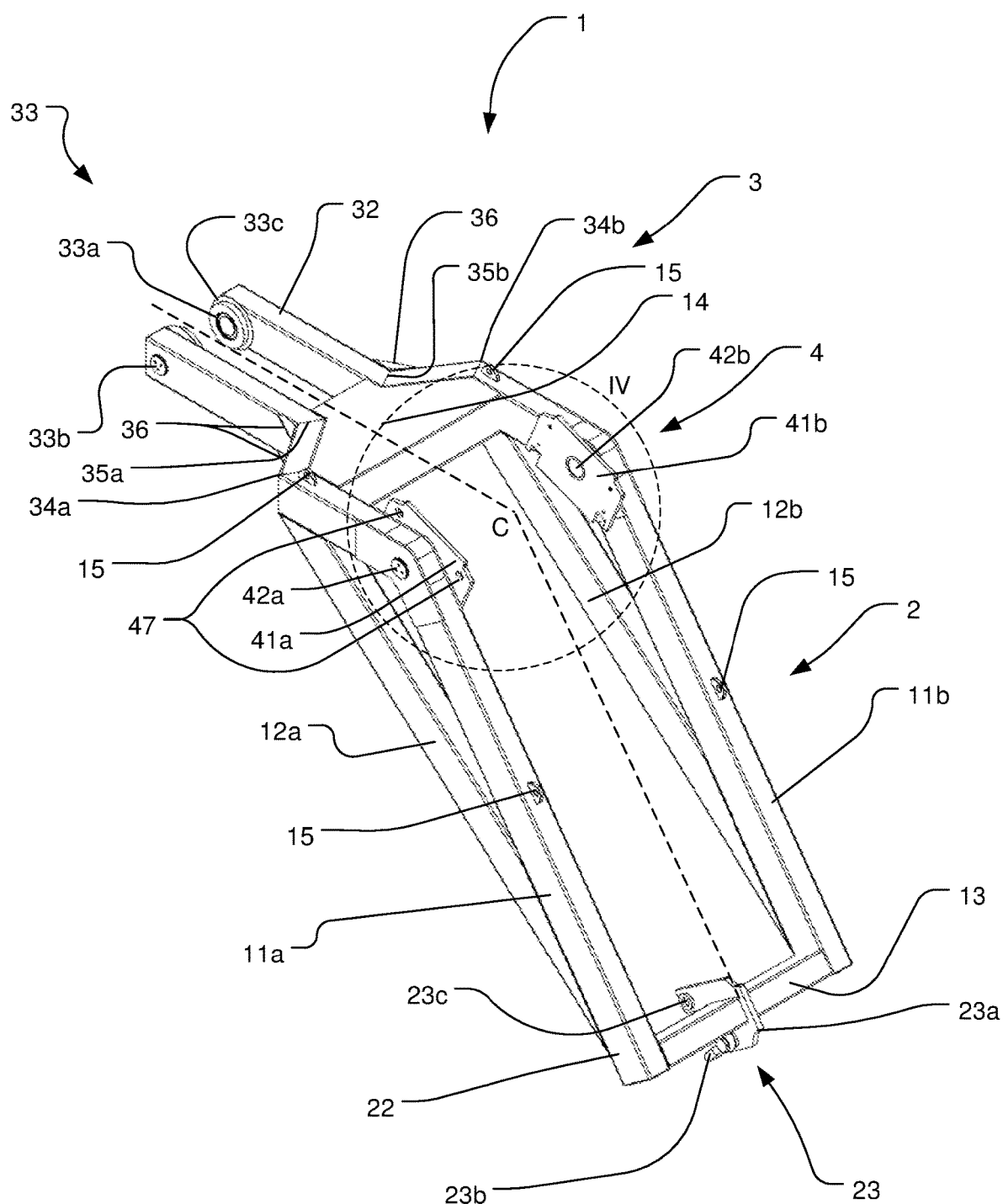
FIG. 2 is a perspective view of the extension yoke in FIG. 1.
Figure 3:
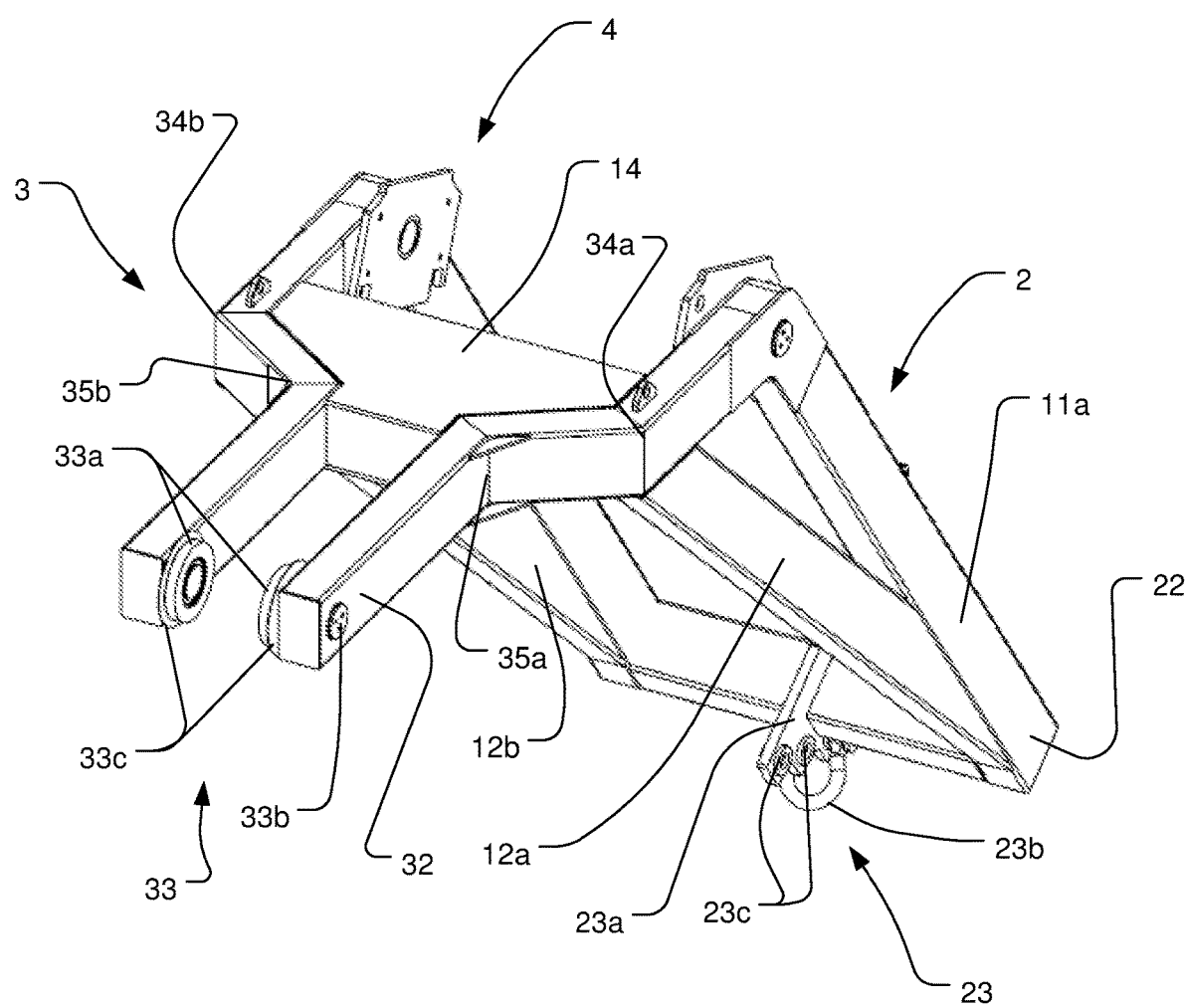
FIG. 3 is a perspective view of the extension yoke of FIGS. 1 and 2 seen from a different angle.

Turning now also to FIGS. 2 and 3, where the extension yoke 1 is shown in perspective views, it is seen that the frame structure comprises several beams, including two substantially parallel longitudinal beams 11a, 11b extending from the distal end of the lifting portion 22 to the distal end of the load transfer portion 32 interconnected by a cross-beam 13 and a box-beam 14.

A frame structure where all beams extend in the same plane so that the beams form only a simple triangle as the one seen FIG. 1 is also possible. It will have a relatively low weight and will be easy to handle and transport, but as the structural stability will also be low, this example will not be described further.

In the frame structure in FIGS. 2 and 3 a cross-beam 13 is situated between and connects the two parallel longitudinal beams 11a, 11b at the distal end of the lifting portion 22. Likewise, a cross-beam in the shape of a box-beam 14 connects the two parallel longitudinal beams 11a, 11b at the load transfer portion 3.

As seen in FIGS. 2 and 3, each of the two parallel longitudinal beams 11a, 11b comprises an inward bend 34a, 34b at the load transfer portion 3, said bends being towards a centre plane C of the frame structure so that the load transfer portion is wider at the proximal end 31 than at the distal end 32 in a direction perpendicular to the centre plane C. Further towards the distal end 32 of the load transfer portion 3 each longitudinal beam 11a, 11b has an outward bend 35a, 35b with an angle corresponding to that of the inward bend, so that the remaining parts of the two parallel longitudinal beams 11a, 11b extending from the outward bends to the distal ends 32 are substantially parallel.

Stiffening members 36 are strengthening the corners created by the outward bends 35a, 35b both on the upper side of the beams and on the lower side of the two longitudinal beams 11a, 11b. In other examples, similar stiffening members could be part of the construction at any welding, bend or connection between beams. In this example the box-beam 14 provides a similar stiffening at the inward bends 34a, 34b.

Two parallel stabilisation beams 12a, 12b extends from the lifting portion distal end 22 to the load transfer portion 3 each connected to one of the parallel longitudinal beams 11a, 11b and attached at the box-beam 14. The box-beam thus serves as a central supporting element and may be provided with an internal supporting structure providing extra strength and/or stiffness. It is, however, also possible to use a simpler cross-beam at the load transfer portion 3 and/or to position it closer to the distal or proximal end of the load transfer portion.

In this example, the beams are steel beams with a substantially rectangular cross-section shape, but the beams could be any chosen from the group consisting of a square beam, I-beam, H-beam, U-beam, round, pipe, and a combination hereof and could be made from other materials, such as aluminium, aluminium alloy, polymer, carbon composite, and a combination of these.

In this particular example, the length Llp of the lifting portion 2 measured from the proximal end 21 to the distal end 22 is approximately 3.2 meters, and the length Ltp of the load transfer portion 3 is approximately 2.3 meters. The total length Ly of the extension yoke 1 measured from the distal end 22 of the lifting portion to the distal end 32 of the load transfer portion is around 4.9 meters, said lengths being shown in FIG. 1. In other examples, the length of the portions may be shorter or longer, and the relation between the length of the two portions can be different such as 1:4, 1:3, 1:2, 1:1, 2:1, 3:1, 4:1 or 5:1. Likewise, the obtuse angle may be made more narrow than shown in FIGS. 1-3, e.g. 100 or 110 degrees, or wider, e.g. 130 or 140 degrees, for shortening or extending the total length Ly of the extension yoke, respectively.

As mentioned above, a load attachment element 23 is provided at the distal end 22 of the lifting portion 2. In this example the load attachment element 23 is in the form of a load attachment plate 23a with a shackle 23b for attaching a load. The shackle 23b in FIG. 1 is a replaceable shackle for a heavy lift, such as a gearbox lift, but other items to be lifted may require other means for attachment, such as a hook. Additional shackles, rings, hooks or the like may be attached to openings 23c in the load attachment plate 23a.

Here a single load attachment plate 23a is positioned at the centre of the cross-beam 13, but it is also possible to have two load attachment plates distance from each other on the cross-beam, or to use a load attachment element 23 without an attachment plate.

At the distal end 32 of the load transfer portion 3 a load transfer element 33 in the form of wheels 33a is provided. Each wheel 33a is here connected to the load transfer portion 3 by a pivot joint 33b, said pivot joint defining an axis of rotation of the wheel. If using a simple triangular frame structure resembling what is seen in FIG. 1, only a single wheel would be needed.

In this example, the wheels 33a are provided on the inner sides of the two parallel longitudinal beams 11a, 11b and with concentric axes of rotation. Each wheel here comprises a wheel flange 33c adapted for coming into contact with a side surface of the crane boom extending at an angle to the reception surface along which the wheel moves when in use as will be described later. The wheel flange can thus contribute to guiding the movement of the wheel and keep it in contact with the reception surface as the load transfer element moves along the reception surface and is displaced in relation to the longitudinal beams.

Lifting brackets 15 are provided on the lifting portion 2 and the load transfer portion 3 respectively being configured for connecting to e.g. a crane for lifting and moving the extension yoke 1 during handling and transportation. In this example there are four such lifting brackets 15, two on each of the parallel longitudinal beams 11a, 11b, one at the lifting portion 2 and one at the load transfer portion 3.

A crane attachment element 4 is provided at the vertex of the obtuse angle. It might in principle be a simple ring or hook, which might be provided on an additional cross-beam (not shown) extending between the longitudinal beams 11a, 11b, but in the example shown, it is a pulley block reception element adapted for receiving a pulley block of a crane. In FIGS. 1-3 only side plates 41, 41a, 41b of the pulley block reception element is shown, and in the following reference will therefore also be made to FIG. 4, showing details of the pulley block reception element 4.

Each side plate 41a, 41b of the pulley block reception element 4 is pivotally connected to the inner side of one of the parallel longitudinal beams 11a, 11b by joints 42, 42a, 42b, so that the extension yoke 1 can rotate about an axis defined by the joints.

Figure 4:
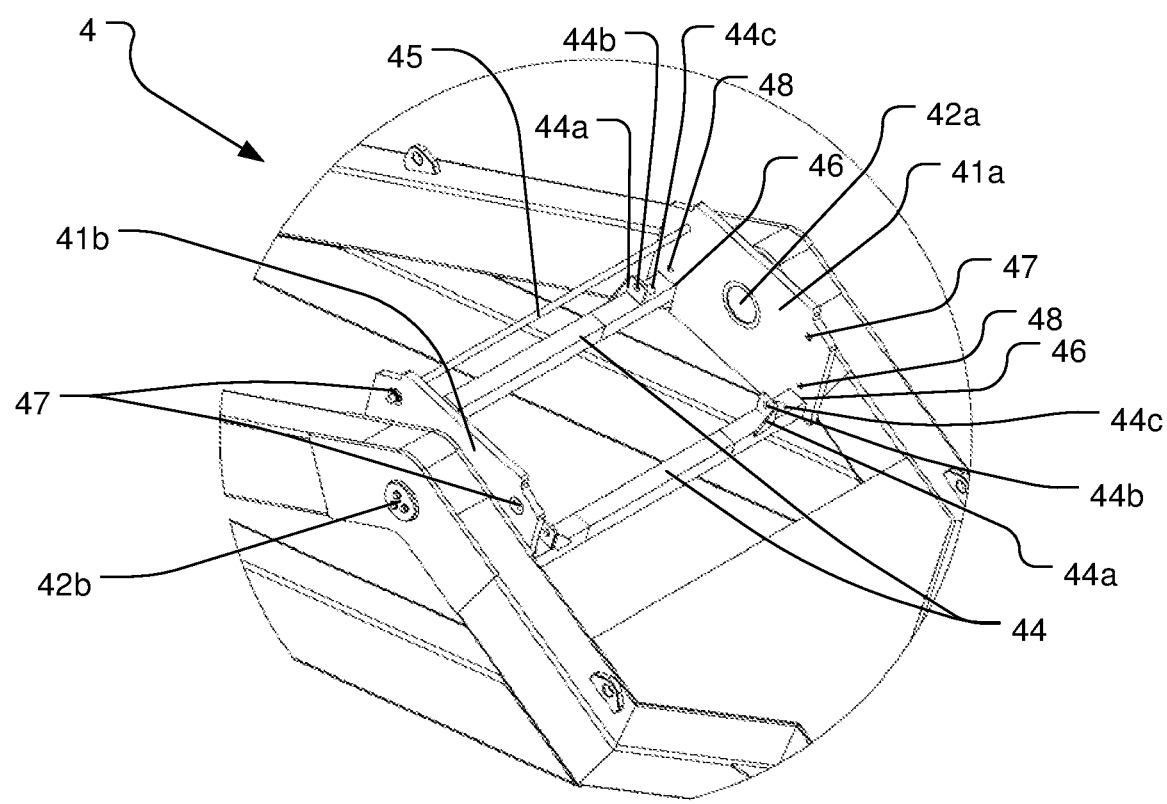
FIG. 4 is a perspective detail view of the detail marked IV in FIG. 2 seen from a different angle and with a pulley block reception element.

As seen in FIG. 4, a plurality of connector members 44, 45 extend between the two side plates 41a, 41b of the pulley block reception element 4, each connector member 44, 45 extending into two opposite openings 46, 47 provided in the side plates. Nuts, pins or other fixation means may be used for fixating the connector members 44, 45 in relation to the side plates.

In this example, two of the connector members are elongated crossbars 44 having a square cross-sectional shape and extending in parallel at the lower side of the plates 41a, 41b. Each plate 41a, 41b has a cutout 46 for each of the crossbars 44 to extend through.

Each of the crossbars 44 are here provided with two crossbar brackets 44a, extending substantially perpendicular to a surface of the crossbar and being in proximity to a side plate 41a, 41b in the mounted state. Each bracket 44a has a hole 44b, which is aligned with a hole 48 in the plate 41a, 41b so that a fastener, such as a bolt, can extend through both holes 44b, 48 and fasten the crossbar 44 to the plate 41a, 41b. In FIG. 4, the crossbars further have holes 44c for fastening the crossbars 44 to a pulley block of a crane.

A further connector member in the form of a rod 45 engages with the side plates 41a, 41b at their upper sides, positioned above one of the cross-bars 44. A corresponding rod (not shown) will be provided above the other crossbar, but it has here been removed in order to facilitate insertion of the pulley block of a crane. One or more of the other connector members may also be removed when inserting or removing a pulley block from the pulley block reception element 4.

Figure 6:
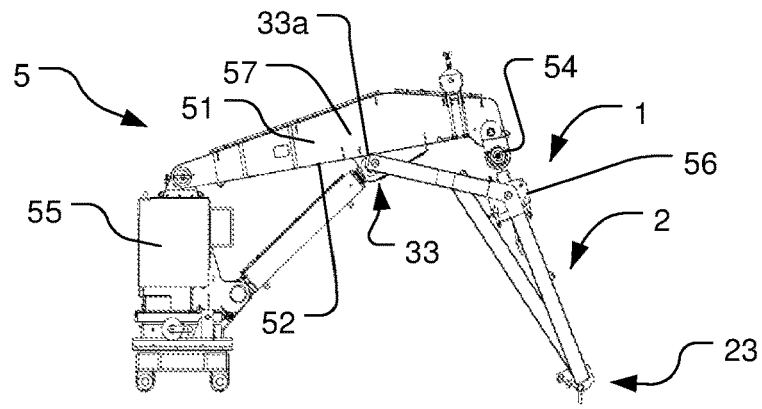
FIG. 6 is a side view corresponding to FIG. 5, but where the load transfer element of the extension yoke is in contact with a reception surface of the crane.
Figure 7:
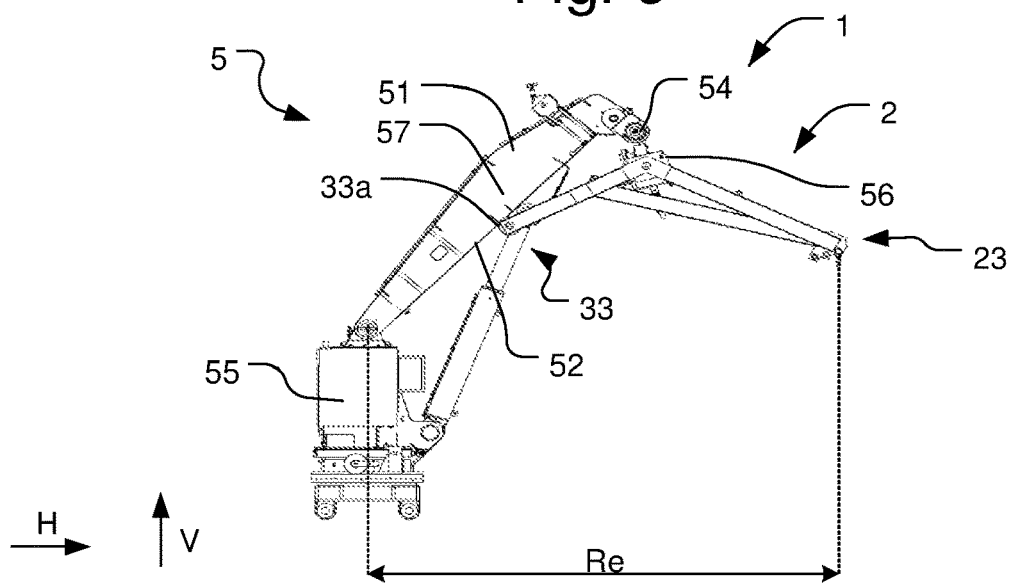
FIG. 7 is a side view corresponding to FIGS. 5 and 6, but where the extension yoke is in an extended position.

The use of the extension yoke 1 is illustrated in FIGS. 6-8, showing three different positions of the extension yoke 1 connected to a crane 5.

Figure 5:
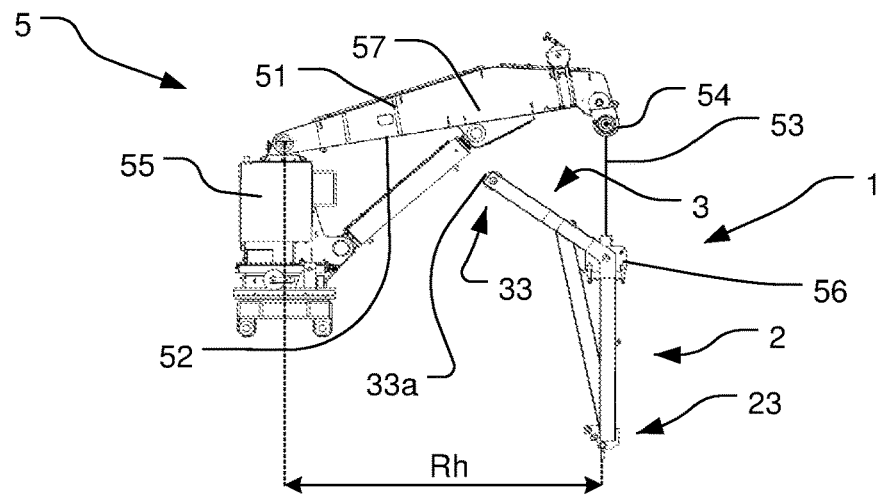
FIG. 5 is a side view of the extension yoke connected to a crane in a hoisting position.

In FIG. 5, the extension yoke 1 is in a hoisting position, before the wheels 33a of the load transfer element 33 comes into contact with the reception surface 52 of the crane boom 51. In this position the extension yoke hangs from the crane pulley block 56 under the influence of gravity and the lifting portion 2 is substantially vertical. If the relative dimensions and/or weight of the lifting portion 2 and the load transfer portion 3 is different, the orientation of the extension yoke in this position may be different.

As the extension yoke 1 is hoisted upwards, the load transfer element 33 comes into contact with the reception surface 52 of the crane boom 51 as shown in FIG. 6.

The crane of FIG. 5-7 comprises a crane base 55, which is configured for being mounted to a nacelle of a wind turbine (not shown), a crane boom 51, a wire 53, a wire wrench 54, and a pully block 56. A distal end of the crane boom 51 is connected to the crane base 55, and the wire wrench 54 is provided at a proximal end of the crane boom opposite the distal end. The wire 53 is guide over wire wrench 54 and connected to the pulley block 56. In FIG. 5 only a single wire section is shown extending between the wire wrench 54 and the pulley block 56, but the skilled person will understand that there may be more than one.

On the side of the crane boom 51 facing downwards in FIGS. 5-7 a substantially flat reception surface 52 is provided. The wheels 33a of the extension yoke in FIGS. 1-4 are adapted for engaging with two edges of plate members (not shown) of the crane boom 51 and the wheel flanges 33c for engaging side surfaces 57 of the crane boom, only one side surface being visible in FIGS. 5-7. In other examples the downwards facing side of the crane boom 51 may be a plate providing a larger planar surface on for engagement with the load transfer element(s) 33. In that case the wheel 33a would be without the wheel flanges 33c, or the wheels could be replaced by rollers, balls or the like. In a still further alternative, the reception surface 52 could be provided with tracks adapted for engaging with one or more slide shoes (not shown) serving as load transfer elements.

In the hoisting position of FIG. 5, the load attachment element 23 is positioned substantially vertically below the wire wrench 54, and the hoisting crane reach Rh from a centre of the crane base 55 to the load attachment element 23 is substantially the same as without the extension yoke 1.

In FIG. 6, the contact between the load transfer element 33 and the reception surface 52 has caused the extension yoke 1 to rotate slightly, such that the load attachment element 23 is now further away from the centre of the crane base 55 than the wire wrench 54.

In FIG. 7, the load transfer element 33 has moved over the reception surface 52 and caused the extension yoke to rotate to a fully extended position. Here the lifting portion 2 has been moved towards horizontal and the load attachment element 23 is positioned significantly further away from the crane base 55 than the wire wrench 54, so that the extended crane reach Re is larger than the hoisting crane reach Rh.

REFERENCE NUMERALS

1 Extension yoke
   11 parallel longitudinal beam
      11a first beam
      11b second beam
   12 stabilisation beam
      12a first beam
      12b second beam
   13 cross-beam
   14 box-beam
   15 lifting bracket
2 lifting portion
   21 proximal end
   22 distal end
   23 load attachment element
      23a plate
      23b shackle
      23c openings
   24 fixed beam joint
3 load transfer portion
   31 proximal end
   32 distal end 33 load transfer element
   33a wheel
   33b joint
   33c wheel flange
34a, 34b inward bend
35a, 35b outward bend
36 stiffening member
4 crane attachment element, pulley block reception element
   41 side plate
      41a side plate
      41b side plate
   42 joint
      42a joint
      42b joint
   44 crossbar
      44a crossbar bracket
      44b bracket hole
      44c crossbar hole
   45 rod
   46 cutout for crossbar
   47 opening
   48 fastener hole
5 crane
   51 crane boom
   52 reception surface
   53 wire
   54 wire wrench
   55 crane base
   56 pulley block
   57 side surfaces
α obtuse angle
Rh reach hoisting position
Re reach extended position
Ly length yoke
Ltp length transfer portion
Llp length lifting portion
C center plane
H Horizontal
V Vertical

What is claimed is:

1. An extension yoke for a self-hoisting wind turbine crane, the extension yoke comprising:
a frame structure comprising:
a lifting portion,
a load transfer portion,
at least one crane attachment element between the load transfer portion and the lifting portion, the at least one crane attachment element being configured to establish a pivot connection to a crane,
wherein the lifting portion has a proximal end at the at least one crane attachment element, a distal end opposite the proximal end of the lifting portion, and a load attachment element at the distal end of the lifting portion,
wherein the load transfer portion has a proximal end at the at least one crane attachment element, a distal end opposite the proximal end of the load transfer portion, and at least one load transfer element at the distal end of the load transfer portion, wherein the load transfer element is configured to be displaced in relation to a reception surface of the self-hoisting wind turbine crane prior to a lifting operation and the load transfer element is configured for being displaced in relation to the reception surface while being in contact therewith during the lifting operation, and wherein the load transfer element is further configured to transfer compressive force by pressing against the reception surface of the self-hoisting wind turbine crane and to move in relation to the reception surface, and
wherein the load transfer portion and the lifting portion form an obtuse angle with each other; and
at least one stabilisation element interconnecting portions of the frame structure, the at least one stabilisation element forming an acute angle with at least one portion of the interconnecting portions of the frame structure.

2. The extension yoke of claim 1, wherein the frame structure comprises at least two substantially parallel longitudinal beams.

3. The extension yoke of claim 2, further comprising:
at least one cross-beam connecting the at least two substantially parallel longitudinal beams.

4. The extension yoke of claim 1, wherein the load attachment element is a shackle, ring, hook, or snap hook.

5. The extension yoke of claim 1, wherein the at least one crane attachment element is provided on a beam of the frame structure.

6. The extension yoke of claim 2, wherein the at least one crane attachment element is a pulley block reception element, comprising:
two plates each being pivotally connected to a longitudinal beam, and
at least one connector member extending between the two plates.

7. The extension yoke of claim 1, wherein the load transfer element comprises at least one element chosen from the group consisting of: a wheel, a ball, a roller, a ball joint, a rounded end, a smoot end surface, a slide plate, a slide shoe, a slide block, a friction reducing coating, and a combination of these.

8. The extension yoke of claim 1, wherein the frame structure comprises beams made from a material chosen from the group consisting of: steel, hardened steel, heat-treated steel, compressed steel, refined steel, compressed steel, aluminium, aluminium alloy, cast iron, polymer, carbon composite, and a combination of these.

9. The extension yoke of claim 1, wherein the load transfer element shifts, during the lifting operation, from a first position in which the load transfer element is displaced in relation to the reception surface of the self-hoisting wind turbine crane to a second position in which the load transfer element is in contact with the reception surface.

10. A self-hoisting wind turbine crane with an extension yoke wherein:
the extension yoke comprises:
a frame structure comprising:
a lifting portion,
a load transfer portion,
at least one crane attachment element between the load transfer portion and the lifting portion,
wherein the load transfer portion has a proximal end at the at least one crane attachment element, a distal end opposite the proximal end of the load transfer portion, and at least one load transfer element at the distal end of the load transfer portion; and
the self-hoisting wind turbine crane comprises:
a crane boom having a reception surface,
a pulley block, and
at least one wire connecting the pulley block to the crane boom,
wherein the extension yoke is pivotally connected to the pulley block via the at least one crane attachment element, and wherein the load transfer element is configured to be displaced in relation to a reception surface of the self-hoisting wind turbine crane prior to a lifting operation, wherein the load transfer element is configured for being displaced in relation to the reception surface while being in contract therewith during the lifting operation, and wherein the load transfer element is further configured to transfer compressive force from the load transfer element to the reception surface.

11. The self-hoisting wind turbine crane of claim 10, wherein the frame structure of the extension yoke comprises at least two substantially parallel longitudinal beams.

12. The self-hoisting wind turbine crane of claim 11, wherein the extension yoke further comprises:
   at least one cross-beam connecting the at least two substantially parallel longitudinal beams.

13. The self-hoisting wind turbine crane of claim 11, wherein the at least one crane attachment element of the extension yoke is a pulley block reception element that comprises:
   two plates each being pivotally connected to a longitudinal beam, and
   at least one connector member extending between the two plates.

14. The self-hoisting wind turbine crane of claim 10, wherein a load attachment element of the extension yoke is a shackle, ring, hook, or snap hook.

15. The self-hoisting wind turbine crane of claim 14, wherein the load attachment element is replaceable.

16. The self-hoisting wind turbine crane of claim 10, wherein the at least one crane attachment element of the extension yoke is provided on a beam of the frame structure.

17. The self-hoisting wind turbine crane of claim 10, wherein the load transfer element of the extension yoke comprises at least one element chosen from the group consisting of: a wheel, a ball, a roller, a ball joint, a rounded end, a smoot end surface, as slide plate, a slide shoe, a slide block, a friction reducing coating.

18. The self-hoisting wind turbine crane of claim 10, wherein the frame structure of the extension yoke comprises beams made from a material chosen from the group consisting of: steel, hardened steel, heat-treated steel, compressed steel, refined steel, compressed steel, aluminium, aluminium alloy, cast iron, polymer, carbon composite.

19. The self-hoisting wind turbine crane of claim 10, wherein the load transfer element shifts, during the lifting operation, from a first position in which the load transfer element is displaced in relation to the reception surface of the self-hoisting wind turbine crane to a second position in which the load transfer element is in contact with the reception surface.

* * * * *